N. J. OAK.
GRADING AND STORING MACHINE FOR POTATOES, ETC.
APPLICATION FILED OCT. 20, 1921.
1,425,791.      Patented Aug. 15, 1922.
2 SHEETS—SHEET 1.
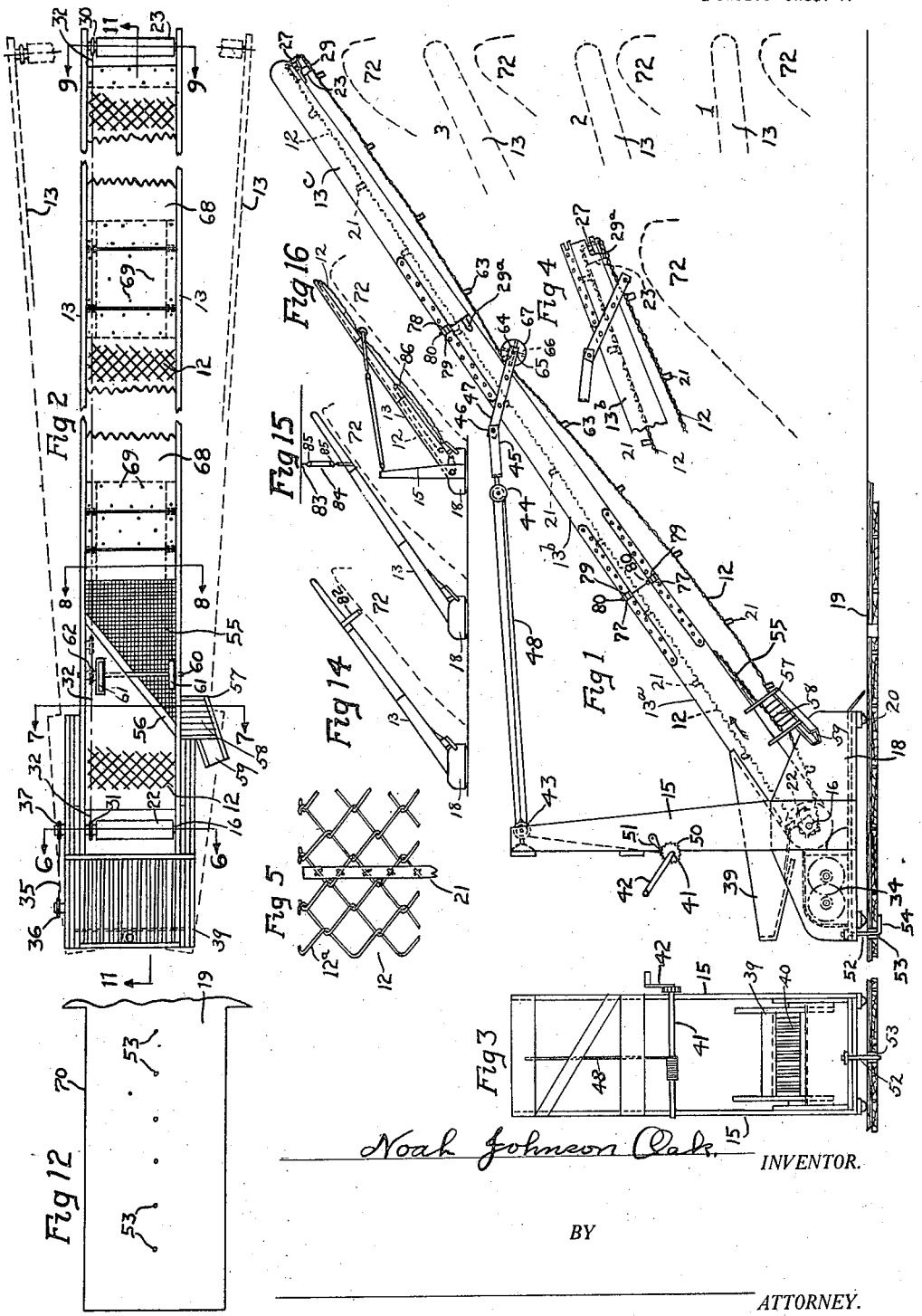
Noah Johnson Oak, INVENTOR.
BY
ATTORNEY.

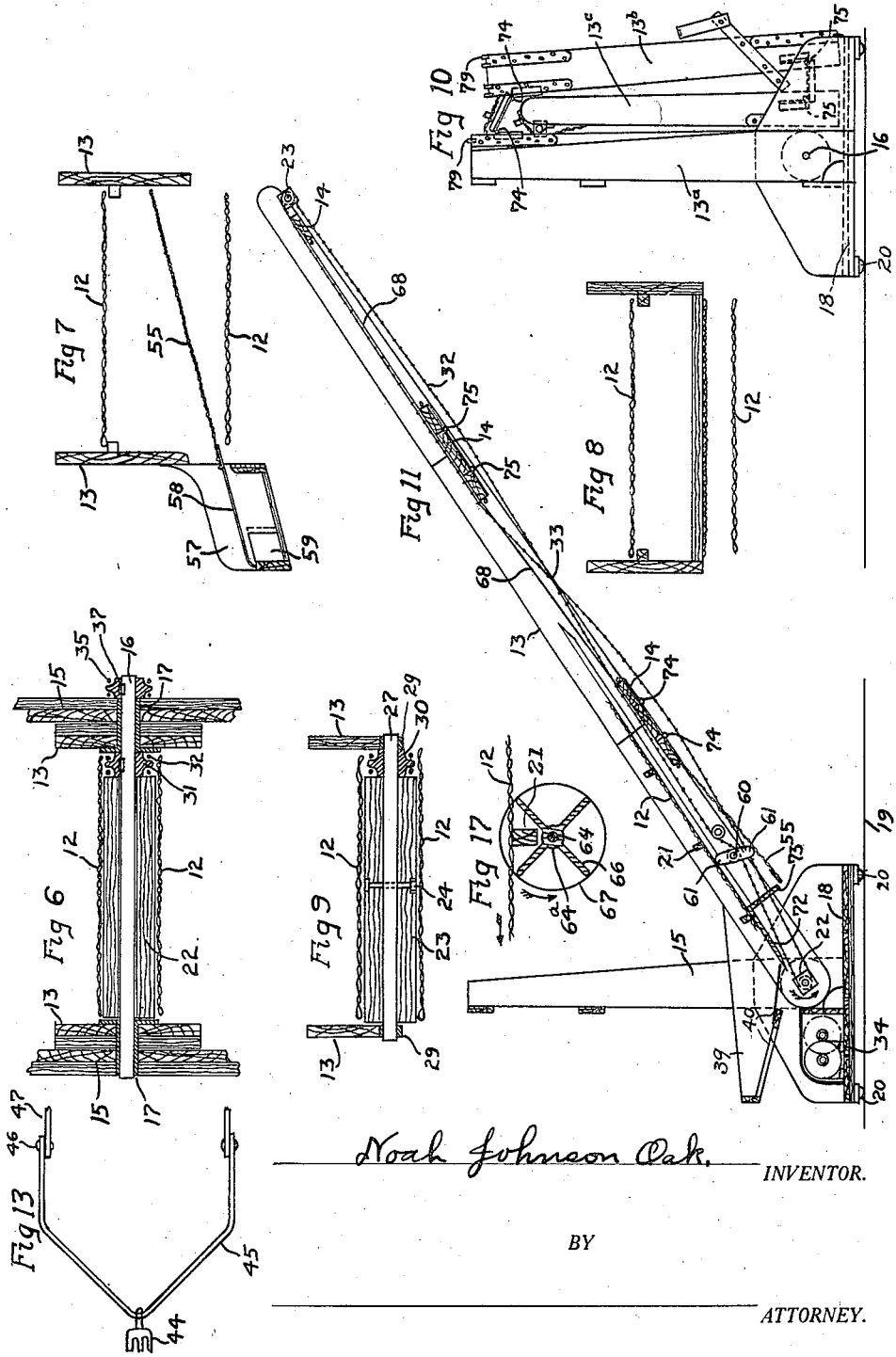

UNITED STATES PATENT OFFICE.

NOAH JOHNSON OAK, OF LYNN, MASSACHUSETTS.

GRADING AND STORING MACHINE FOR POTATOES, ETC.

1,425,791.     Specification of Letters Patent.     Patented Aug. 15, 1922.

Application filed October 20, 1921. Serial No. 508,915.

*To all whom it may concern:*

Be it known that I, NOAH J. OAK, a citizen of the United States, residing at Lynn, in the county of Essex and State of Massachusetts, have invented certain new and useful Improvements in Grading and Storing Machines for Potatoes, Etc., of which the following is a specification.

The invention is embodied in a simple and effective machine adapted to receive potatoes of various sizes as harvested, separate the firsts from the seconds and culls, store the firsts in a bin, freight car, or other receptacle, and deliver the seconds and culls outside the receptacle.

One object of the invention is to provide a machine adapted to elevate and then drop the potatoes in depositing the same, the machine being adjustable in such manner that the elevation and the fall of the potatoes may be varied with the height of the pile, so that bruising of the potatoes by falling too far, and contacting too forcibly with the pile may be prevented, and a pile of any desired height may be formed.

Another object of the invention is to provide a machine adapted to distribute the potatoes by horizontally varying the location of their delivery, so that an oblong pile or accumulation of any desired height may be conveniently formed in an oblong receptacle.

Other objects of the invention will appear hereinafter.

Of the accompanying drawings forming a part of this specification,—

Figure 1 is a side elevation of a machine embodying the invention.

Figure 2 is a top plan view of the same, parts being broken away.

Figure 3 is an end view.

Figure 4 is a fragmentary side view, showing a portion of the boom hereinafter described.

Figure 5 is a fragmentary plan view, showing a portion of the reticulated conveyor belt.

Figure 6 is a section on line 6—6 of Figure 2.

Figure 7 is a section on line 7—7 of Figure 2.

Figure 8 is a section on line 8—8 of Figure 2.

Figure 9 is a section on line 9—9 of Figure 2.

Figure 10 is a side elevation, showing the machine inoperative, and folded for storage, parts being omitted.

Figure 11 is a section on line 11—11 of Figure 2.

Figure 12 shows diagrammatically a bin with a row of holes in its bottom.

Figure 13 is a fragmentary plan view, showing a detail.

Figures 14, 15 and 16 are side elevations, showing modifications.

Figure 17 is a fragmentary sectional view, showing the idle pulley hereinafter described, and a portion of the conveyor belt.

The machine of my invention comprises an elongated boom, formed to support and guide an endless conveyor belt 12. The boom is preferably composed of two elongated parallel side bars 13, and suitable transverse connections 14 (Figure 11), whereby the bars are rigidly connected and spaced apart. The inner ends of the boom bars 13 are pivotally connected to uprights or standards 15, forming members of a portable holding structure which supports the boom. The pivotal connection is preferably provided by a horizontal shaft 16, (Figure 6), having bushings 17, inserted in the standards 15, and in the boom bars 13, the bars being adapted to turn on the bushings. The holding structure includes a base portion 18, of considerable horizontal area, to which the standards 15 are attached. Said structure is portable, so that it may be moved on the floor 19 of a potato house, or other horizontal support, and may be provided with casters 20 to facilitate its movement.

The conveyor belt 12 is reticulated, and its openings are formed to permit the smaller potatoes, known as seconds and culls, to drop therethrough, the belt being adapted to retain and convey the firsts or larger potatoes. The belt is preferably of the wire mesh variety shown by Figure 5, and is provided with spaced apart cross-bars 21, projecting from its external surfaces, to engage potatoes deposited on the upper stretch of the belt and prevent them from rolling downward indefinitely, the belt being longitudinally inclined when in operation. With the inner end of the boom is connected an inner belt-engaging pulley 22, and with the outer end is connected an outer belt-engaging pulley 23, said pulleys being preferably square in cross section to enable them to effectively engage the conveyor belt. The inner pulley 22 is loose on the shaft 16, and the outer pulley 23 is fixed, as by a bolt 24, to a shaft 27 which is journaled in bearings 29 (Figure 9) at the outer ends of the boom arms 13.

The outer pulley 23 constitutes an element of the mechanism for driving the conveyor belt 12, and is positively driven in the direction required to pull the upper stretch of the belt toward the outer end of the boom. Said mechanism also includes a sprocket-wheel 30, fixed to the outer shaft 27, a sprocket-wheel 31 fixed to the inner shaft 16, and an endless sprocket chain 32 engaging said wheels. The chain is crossed as indicated at 33 (Figure 11). The shaft 16 and the sprocket-wheel 31 are driven by power applied thereto from any suitable source, and preferably from a motor, conventionally shown at 34 (Figures 1 and 11), mounted on the base 18 of the holding structure, and a sprocket-chain 35 (Figures 2 and 6) engaged with a sprocket-wheel 36 (Figure 2), driven by a shaft of said motor, and with a sprocket-wheel 37, fast on the shaft 16. The sprocket-wheel 31 is thus positively driven and drives the crossed chain 32. The described mechanism enables the outer belt-engaging pulley to be positively driven in the direction required to pull the upper stretch of the belt 12 and its load of potatoes outwardly from the inner end of the boom. The loaded upper stretch of the belt bears a certain resemblance to a rope which, as is well known, is more advantageously moved endwise by a pulling than by a pushing strain. The successful employment of the wire mesh conveyor belt as an element of the machine is made possible by the described operating mechanism including the crossed chain 32.

Potatoes, as harvested, are dumped into a hopper 39, fixed to the holding structure. Said hopper has a grated bottom 40 overlapping the inner end portion of the upper stretch of the belt 12, and adapted to guide the potatoes on to said stretch, the dirt falling through the grated bottom without reaching the belt.

In the preferred embodiment of the invention, mechanism is provided for raising and lowering the boom by swinging it in a vertical plane, and for locking the boom at any adjusted position. Said mechanism preferably comprises a winding shaft or drum 41, journaled in bearings in the standards 15, and provided with a crank 42, a pulley 43, secured to a cross-bar between the standards 15, a pulley 44 secured to a yoke 45, which is pivoted at 46 to ears 47, fixed to the boom bars 13, and a rope 48 engaged with the shaft 41, and with the pulleys 43 and 44. Rotation of the shaft 41 in one direction raises the boom, and rotation in the opposite direction permits the boom to descend. A ratchet 50 and a dog 51 are provided to lock the shaft 41, and thus retain the boom at any adjusted height.

I prefer to pivotally connect the base 18 of the holding structure with the support 19, in such manner that said structure may turn on a vertical axis, and swing the boom horizontally, so that the potatoes delivered by the conveyor belt may be distributed from side to side, or from end to end of a receptacle. The pivotal connection may be provided by an upright bolt 52, engaged with and projecting downward from the base 18, through a hole 53 provided for its reception in the support. The bolt has a head 54, bearing on the under side of the support.

The upper and lower stretches of the belt are spaced apart sufficiently to provide room between them for means for conducting seconds (also culls) outwardly from between said stretches, and discharging the same at one side of and between the ends of the boom. I prefer to embody said means as follows: 55 represents a screen fixed to the boom and located between the belt stretches, in position to receive the seconds and culls which drop through the upper stretch of the belt. The screen is adapted to drop the dirt mixed with the seconds and culls, the dirt falling through the meshes of the screen and of the lower stretch of the conveyor belt. The screen is inclined endwise like the boom, and is also inclined sidewise, as shown by Figure 7, and has at its lower end portion an oblique guide or bar 56 (Figure 2), adapted to direct potatoes rolling on the screen to a lateral chute 57, projecting from one edge of the boom. The chute has a grated bottom 58 which guides the seconds to the outer end of the chute, and permits the culls to drop into a branch 59, whereby the culls are separately discharged. To agitate the upper stretch of the belt 12 and the screen 55, and thus aid them in performing their functions, I provide knocking or agitating mechanism, preferably embodied as follows: 60 represents an agitator shaft journaled in the boom bars between the stretches of the conveyor belt, and between the upper stretch and the screen 55. Said shaft is provided with strikers 61, arranged in pairs and adapted to intermittently strike and raise a portion of the upper stretch of the belt, and intermittently strike and depress a portion of the screen. The agitator shaft is provided with a sprocket-wheel 62, engaged with and continuously driven by the conveyor-belt driving sprocket-chain 32. The agitation of the belt and screen distributes potatoes piled on each other on the belt, and facilitates the separation of the seconds and culls from the firsts, and increases the effectiveness of the screen.

The conveyor-belt is provided with transverse cleats 21, which project from its outer surface, and prevent potatoes from rolling indefinitely downward on the upper stretch of the belt, the cleats being preferably strips of wood suitably attached to the meshes of the belt. Sagging of the lower stretch of the belt is limited by an elongated idle pulley, the shaft 64 of which is journaled in fixed ears 65 on the boom arms, and extends crosswise of the belt. The pulley is composed of a hub 64$^a$ (Figure 18), arms 66 radiating from the hub, and heads 67 at the ends of the arms. This construction provides recesses in the periphery of the pulley through which the belt cleats 21 pass, as indicated by Figure 17, the cleats engaging the arms 66 and rotating the pulley.

The boom is provided with a sheet metal partition 68, located between the stretches of the belt and attached as by fastenings 69 (Figure 2), to the transverse connections 14.

The boom is also provided with a guard plate 72 (Figure 11), covering the under side of the conveying portion of the conveyor belt, at the receiving end thereof, and closing the meshes of said portion to prevent the seconds and culls from falling through the belt until they have been carried by the latter to a point over the screen 55. Projecting downward from the upper end of the guard plate 72 is an inclined guide or deflector 73 (Figure 11), which directs falling seconds and culls on to the lower end portion of the screen.

In operating the machine the holding structure is located and suitably anchored, as by the pivotal connection or bolt 52, to a support 19, such as the floor of a potato house. If the support is the floor of a bin 70, indicated by Figure 12, the support may have a row of holes 53, each adapted to receive the bolt 52. The boom is lowered to the lowest inclined position 1, indicated by dotted lines in Figure 1. The potatoes, as brought from the field, are dumped into the hopper 39, and find their way to the lower portion of the upper stretch of the belt 12, the loose dirt falling between the bars of the hopper bottom. When the potatoes have been carried across the guard 72, the seconds and culls drop through the belt on to the screen 55, and are conducted separately from the machine by the chute 57, and its branch 59. The firsts are conveyed to the upper end of the boom, and drop from the belt to form a pile 72, the low elevation of the boom permitting the firsts to drop without being bruised, which is an important desideratum in handling potatoes. As the pile increases, the boom is raised from time to time, and successively occupies the dotted line positions 2, 3 and 4, and the final position shown by full lines (Figure 1), the upper end of the boom being kept near the top of the pile. The machine may be turned on the pivot bolt 52 as may be required to swing the boom laterally or horizontally, as indicated by dotted lines in Figure 2, and thus distribute the deposited potatoes. The boom may be caused to enter a freight car, located beside the support 19, the machine being operated to load the car.

To provide for the shortening of the boom when the machine is used for loading a car, and when the machine is to be reduced to compact form, as shown by Figure 10, for storage and shipment, I construct the boom in separable sections, detachably connected. As shown by Figures 1, 10 and 11, three sections may be employed, these sections being designated in Figure 10 by the reference characters 13$^a$, 13$^b$ and 13$^c$. The inner or base section 13$^a$ is pivoted to the holding structure by the shaft 16. The intermediate section 13$^b$ is permanently connected with the base section by double jointed hinge connections each including two spaced apart knuckles 74. The outer section 13$^c$ is permanently connected with the intermediate section by similar double jointed hinge connections each including two spaced apart knuckles 75. The arrangement of said hinge connections is such that when the boom is folded, the outer section 13$^c$ is interposed between the base section and the intermediate section, as shown by Figure 10. To permit the belt to be folded, with the boom, the belt may be broken, or have its continuity interrupted, as by separating one of the zig-zag wire members 12$^a$ (Figure 5) from the member with which it is interengaged, this being accomplished by bending the wire.

The section 13$^a$ is additionally and separably connected with the intermediate section, as by hinges having knuckles at 77 (Figure 1), and the outer section is similarly connected with the intermediate section, as by hinges having knuckles at 78, each of said hinges including socket members 79, and pintle members 80. The said hinges hold the boom sections in alinement with each other when the machine is in operation. The pintle members are removable from the socket members to permit the described folding of the boom. The socket members 79 of some of the hinges are shown at the upper portion of Figure 10.

To shorten the boom I remove the pintle members of the hinge connections between the outer section 13$^c$ and the intermediate section 13$^b$, and temporarily discard the outer section, leaving the intermediate section 13$^b$ as the outer end of the boom, as shown by Figure 4. The base section and the intermediate section, therefore, constitute a shortened boom, and may be considered as collectively constituting the inner section of a two-section boom. The intermediate section is provided at its outer end with bearings 29$^a$, for the shaft 27 of the outer belt-engaging pulley 23, said pulley being transferred from the bearings 29 to the bearings 29ª, and the belt 12 being shortened by removing a section thereof. The machine is thus adapted for loading freight cars.

The motor 34 is preferably arranged, as shown by Figures 1 and 11, to counter-balance the weight of the boom and its load, so that the machine may be self-supporting. The pivot bolt 52 is arranged in close proximity to the motor, and prevents the tipping of the machine by the weight of the boom and its load.

Figure 14 shows a modification in which the boom is supported by the pile 72, the boom having a foot 82 bearing on the pile.

Figure 15 shows a modification in which the boom is adjustably supported from a fixed overhead support 83, by a suspension device, which may include a rope 84 and pulleys 85.

Figure 16 shows a modification in which an endless wire mesh belt 86 is substituted for the screen 55. Said belt may be driven by the chain 32 which drives the conveyor belt 12, the arrangement being such that the upper stretch of the belt 86 moves in the opposite direction from the upper stretch of the belt 12, the seconds and culls falling on the belt 86, and passing from thence to the chute 57.

When the machine is used for bagging potatoes, a bag rack or holder may be located at the outer end of the boom, to hold a bag in position to receive the potatoes delivered by the belt.

I claim:

1. A potato-grading and storing machine, comprising, in combination, a portable holding structure adapted to rest on a floor, a boom pivoted at one end to said structure to swing in a vertical plane, and provided with belt-supporting pulleys at its opposite ends, adjustable means connecting the boom with the supporting structure to support the boom in an inclined position and vary its inclination and the height of its outer end, a reticulated endless conveyor belt engaged with said pulleys, mechanism carried by the holding structure and the boom, for driving the belt to move its upper stretch outward from the holding structure, a hopper mounted on the holding structure in position to deliver potatoes to the inner end of the upper stretch of the belt, the belt being adapted to convey firsts on its upper stretch to the outer end of the boom, and to drop seconds and culls, means between the stretches of the belt for collecting seconds and culls and laterally discharging the same at one side of the boom, and anchoring means for detachably securing the holding structure to a floor supporting the same.

2. A potato-grading and storing machine, comprising, in combination, a portable holding structure adapted to rest on a floor, a boom pivoted at one end to said structure to swing in a vertical plane, and provided with belt-supporting pulleys at its opposite ends, adjustable means connecting the boom with the supporting structure to support the boom in an inclined position and vary its inclination and the height of its outer end, a reticulated endless conveyor belt engaged with said pulleys, mechanism carried by the holding structure and the boom, for driving the belt to move its upper stretch outward from the holding structure, a hopper mounted on the holding structure in position to deliver potatoes to the inner end of the upper stretch of the belt, the belt being adapted to convey firsts on its upper stretch to the outer end of the boom, and to drop seconds and culls, means between the stretches of the belt for collecting seconds and culls and laterally discharging the same at one side of the boom, and anchoring means for detachably securing the holding structure to a floor supporting the same, said anchoring means being adapted to permit the turning of the machine, and the swinging of the boom on a vertical axis, so that firsts delivered by the belt may be laterally distributed.

3. A grading and storing machine comprising a portable holding structure, a boom pivoted at its inner end to said structure, and an endless reticulated conveyor-belt carried by the boom and adapted to be made non-continuous, the boom including a base section pivoted to the holding structure, and a plurality of additional sections, means being provided for rigidly connecting the sections end to end to form an elongated boom, and permitting the additional sections to be folded beside each other and beside the base section on the holding structure, to form a compact assemblage whose length is determined by the length of the sections.

4. A grading and storing machine comprising a portable holding structure, a boom pivoted at its inner end to said structure, and an endless reticulated conveyor-belt carried by the boom, and adapted to be made non-continuous, the boom including a base section pivoted to the holding structure, an intermediate section, and an outer section, permanent double jointed hinge connections connecting said sections, and adapted to permit the sections to be folded side by side, with the outer section between the inner and the intermediate sections, and means for holding the sections in alinement with each other.

5. A grading and storing machine comprising a portable holding structure, a boom pivoted at its inner end to said structure, and including a base section pivoted to the holding structure, an intermediate section, provided at its outer end with bearings, and an outer section also provided at its outer end with bearings, permanent hinge connections connecting said sections and having provisions for permitting the storing of the sections and the belt in folded relation on the holding structure, means being provided for separably connecting the sections and holding the same in alinement with each other, an endless reticulated conveyor-belt adapted to be made non-continuous, and a belt-engaging outer pulley having means whereby it may be engaged with the bearings of either of said intermediate and outer sections.

In testimony whereof I have affixed my signature.

NOAH JOHNSON OAK.